United States Patent [19]

Blach

[11] 4,236,833

[45] Dec. 2, 1980

[54] SCREW MACHINE FOR PROCESSING MATERIALS OF SOLID, PASTY AND LIQUID CONSISTENCY

[76] Inventor: Josef A. Blach, Wilhelmstr. 24, D 7144 Asperg, Fed. Rep. of Germany

[21] Appl. No.: 4,491

[22] Filed: Jan. 18, 1979

[30] Foreign Application Priority Data

Jan. 19, 1978 [DE] Fed. Rep. of Germany ....... 2802125
Jun. 24, 1978 [DE] Fed. Rep. of Germany ....... 2827877

[51] Int. Cl.³ .............................................. B29B 1/10
[52] U.S. Cl. ................................................... 366/85
[58] Field of Search ............... 366/300, 301, 297, 298, 366/299, 83, 84, 85, 87, 88, 90, 75, 290, 291; 425/207, 208, 209

[56] References Cited

U.S. PATENT DOCUMENTS

| 2,584,225 | 2/1952 | Plunguian | 366/300 |
| 3,764,114 | 10/1973 | Ocker | 366/301 |
| 3,993,292 | 11/1976 | Skidmore | 366/87 |

Primary Examiner—Robert W. Jenkins
Attorney, Agent, or Firm—Bernard & Brown

[57] ABSTRACT

Screw machine for processing materials of solid, liquid and pasty consistency. In a housing several rotatable, interengaging screw shafts are mounted with their axes being parallel to each other. For each screw shaft the housing is provided with a cavity and the combination of these cavities defines a cross-section in the form of overlapping circles being concentric to the screw shaft axes. In a longitudinal area of the cavities each of the screw shafts is formed of a core shaft and of several non-circular disc sections arranged consecutively in axial direction on this core shaft and opposite the disc sections of the adjacent screw shaft.

For forcing the material to be processed through each of the areas of screw shaft interengagement large and small circular rings being concentric to the respective screw shaft axis are arranged between the disc sections of each screw shaft, the radius of the large circular rings being only slightly smaller than the radius of the cross-sectional circle of the respective housing cavity; and the diameter of the small circular rings equals the difference between twice the distance between adjacent screw shaft axes and the diameter of the larger circular rings. On each screw shaft the large and the small circular rings are arranged alternately, and the small circular rings of each screw shaft are arranged opposite the large circular rings of the adjacent screw shaft.

6 Claims, 12 Drawing Figures

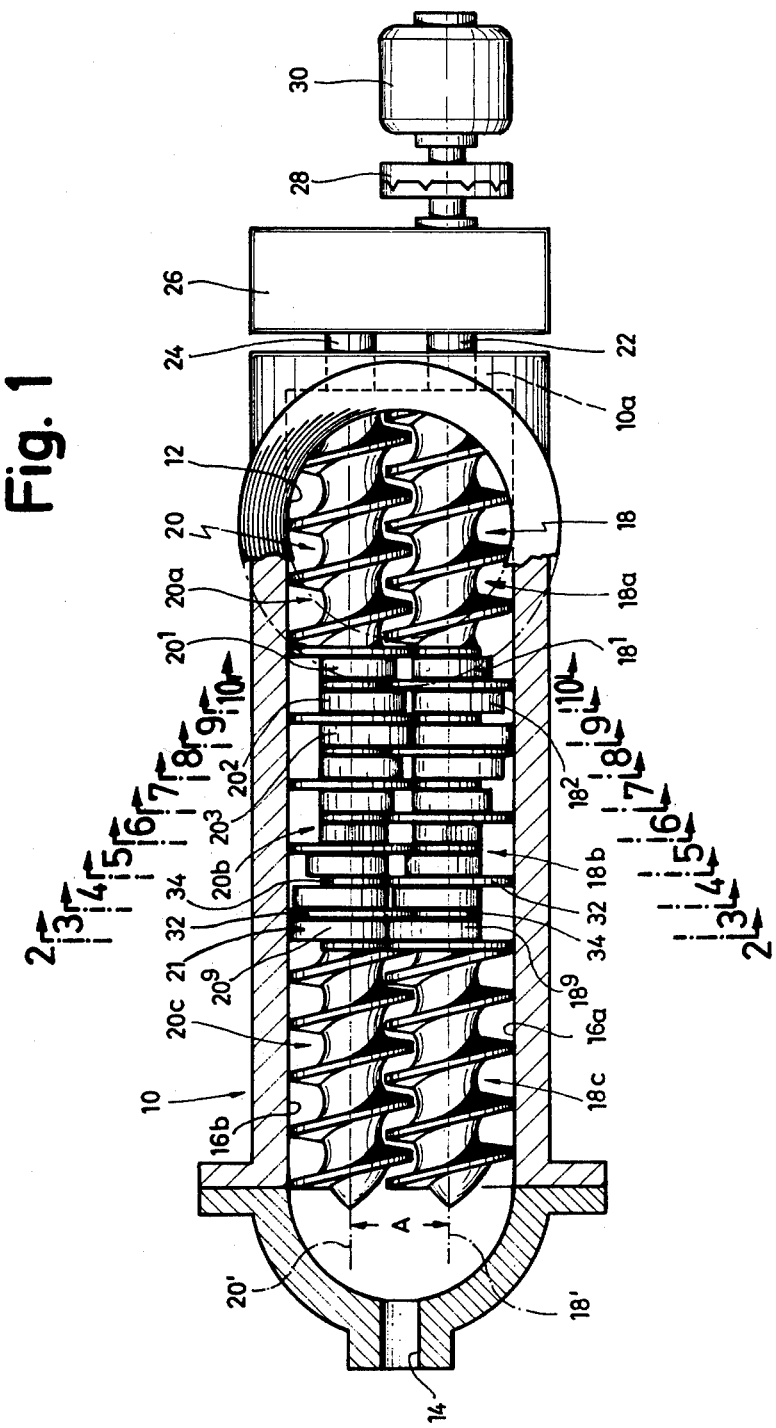

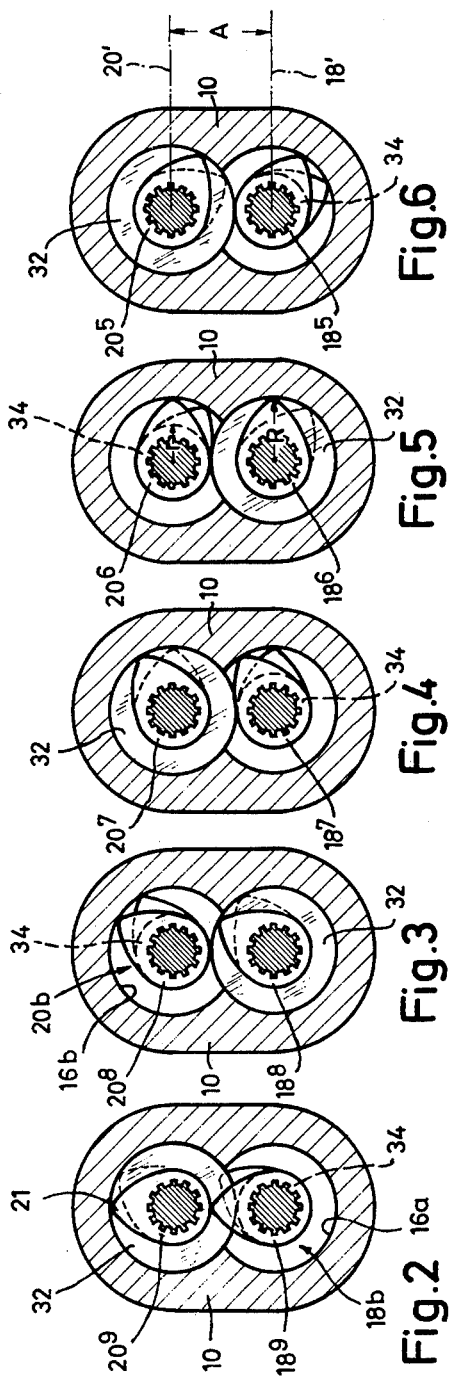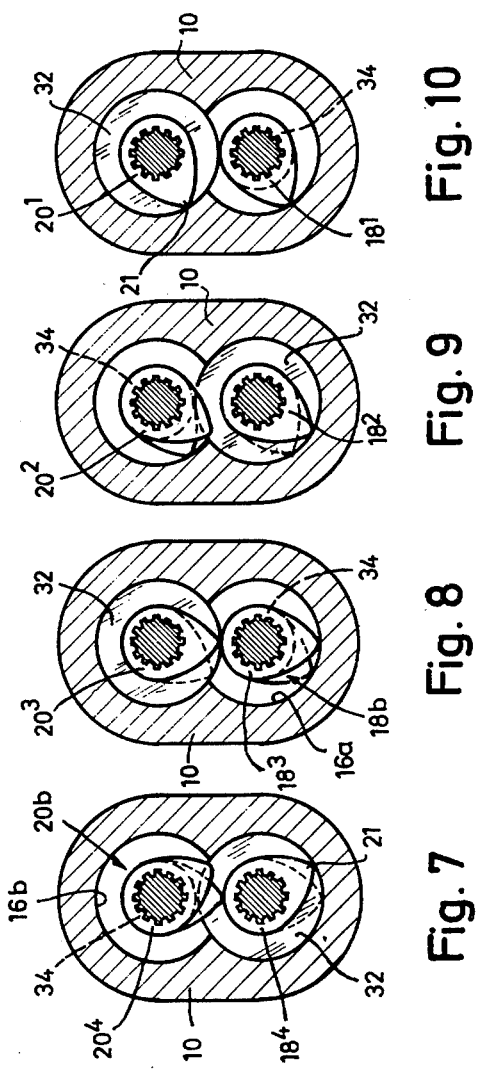

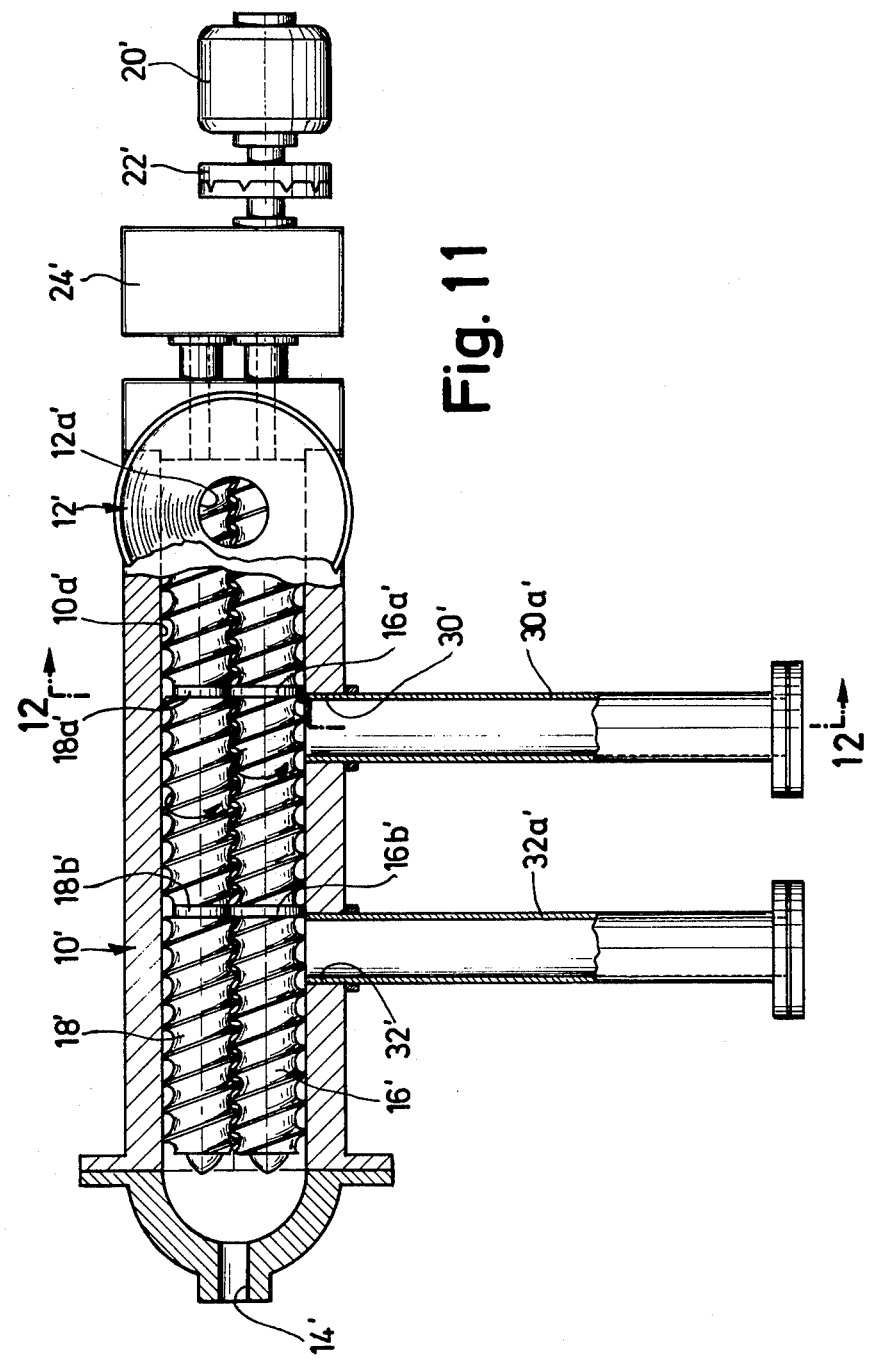

SCREW MACHINE FOR PROCESSING MATERIALS OF SOLID, PASTY AND LIQUID CONSISTENCY

DESCRIPTION

The present invention relates to screw machines for processing materials of solid, pasty and liquid consistency using screw machines of the type mainly used for homogenizing purposes. The term "homogenizing" as used herein is meant to describe all those processes by means of which the macro- or micro- structure of mono- or multi-component masses is made more uniform, i.e. especially the processes of mixing, kneading, dispersing, emulsifying and plasticizing.

In particular, the present invention is related to a screw machine having at least two interengaging screw shafts which can be driven in the same direction and which are arranged for rotation in a cavity of a housing whose cross-section has at least in one certain longitudinal area of said two screw shafts the shape of two overlapping circles concentric to the screw shaft axes. Although screw machines of this type have been previously known, the known machines offer the drawback that the undesirable creeping of material and/or gas along one shaft cannot be prevented. Accordingly, it is the object of the present invention to provide a screw machine of the above-described type in which the creeping of material and/or gases in the longitudinal direction of one shaft can be prevented by simple means, at least at one predetermined point.

According to the invention, this object is achieved by an arrangement in which at least the first of said screw shafts comprises at least one first circular ring which is concentric to the screw shaft axis and has a radius that is only slightly smaller than the radius of the cross-sectional circle of the housing cavity associated with the said screw shaft. Such a circular ring serves as a barrier which prevents material and/or gases from creeping along the said first shaft.

There have been previously known screw machines of the abovedescribed type for working and/or processing plastic and other materials in which each of the screw shafts comprises at least two screw sections for conveying the material to be processed and, between the latter, several disk sections which are arranged consecutively in axial direction and have a cross-section that differs from a circle concentric to the screw shaft axis, and which have arranged between them intermediate annular disks which prevent the disk sections of the interengaging screw shaft from rubbing against each other as a result of uneven temperature conditions or manufacturing inaccuracies. The radius of the said intermediate annular disks corresponds to the radius of the screw sections at the point of their lowest elevation.

Since the cross-section of the housing cavity must be selected to meet the largest outer diameter of the shafts, the shafts do not seal the housing cavity in axial direction in the areas of the disk sections and the intermediate disk sections as effectively as in the area of the screw sections of the shafts. As a result, a certain part of the material to be processed will creep along the shafts without being guided through each of the areas of shaft interengagement. It is apparent, that the screw machines of the type described offer the drawback that they do not uniformly subject all the material particles to the same stresses. Moreover, they do not provide optimum homogenization due to the fact that in the case of screw machines comprising several interengaging shafts which are driven in the same directions, the most effective areas are those in which the shafts mesh each other since at these points the difference in speed reaches twice the value encountered about the remaining circumference of the shaft, while at the same time the particles are subjected here to the greatest changes in their direction of movement. However, the dynamic forces acting upon the particles change in proportion to the square value of the speed, and the forces of viscosity and pressure change in proportion to the speed.

Making use of the basic idea of the present invention, these disadvantages may be prevented by providing between at least two adjacent disk sections of the first shaft a circular ring arranged concentrically to the shaft axis and having an outer diameter that is only slightly smaller than the diameter which the concentric cross-sectional circle of the housing cavity exhibits in the area of the said circular ring, and by providing on the second shaft in opposite relation to the first circular ring a second circular ring arranged concentrically to the shaft axis and having an outer diameter equal to, or only slightly smaller than, the difference between twice the distance between the screw shaft axes and the outer diameter of the first circular ring. Thus, the housing cavity is axially sealed outside the intermeshing areas of the shafts between the latter's disk sections, and in the area of the disk sections any axial displacement of the material to be processed is prevented outside the intermeshing areas so that practically all particles are caused to move through the greatest possible number, or even all, intermeshing areas between the disk sections.

Thus, the application of the arrangement of the invention permits, among other things, the improvement of the homogenizing effect, because the big first circular rings will, wherever they are provided, prevent any axial movement of the particles outside the intermeshing area by causing them to change over into the area of the shaft opposite the big circular ring for being advanced in axial direction, where they will automatically be passed through the intermeshing area.

Of course, it is also possible to give the large circular ring a somewhat smaller configuration and, if necessary, to adapt the diameter of the small circular ring accordingly, if a certain loss in efficiency is taken into account. Moreover, it goes without saying that the disk sections and the circular rings need not be separate parts and that the disk sections of the shafts need not necessarily be arranged exactly opposite each other, but may also be a little offset in axial direction, provided that their distances and thicknesses are selected to prevent them from rubbing against each other.

Finally, it should be noted that in cases where the circular rings are designed as separate parts, they need not be fastened against rotation to the latter, since they only have to serve as a barrier.

In a preferred embodiment of the screw machine of the invention, circular rings are provided between all disk sections so that this embodiment is characterized by the fact that a first or second circular ring is arranged between more than two consecutive disk sections of each screw shaft and in that first and second circular rings are arranged alternatively on each screw shaft. In this case, practically all particles must pass the full number of intermeshing areas between the disk sections.

Screw machines of the before-described type usually have one or more degasifying apertures formed by vertically arranged channels extending upwardly from the housing cavity accommodating the screws. However, the known designs have the disadvantage that the degasifying apertures tend to be blocked by material which is entrained by the escaping gases along the screws and hurled upwardly into the degasifying channels.

In the case of screw machines having several degasifying apertures arranged one behind the other along the screw shaft, there is sometimes a vacuum applied to one of the said apertures. When in such cases the shafts are provided between the degasifying apertures, for instance for the purposes of mixing or kneading, with disk sections having a cross-section differing from a circle concentric to the shaft axis, the flow resistance encountered between the degasifying apertures is too low, i.e. the vacuum applied to the one degasifying aperture is rendered essentially ineffective by the air drawn in through the other degasifying opening.

In order to prevent that notable quantities of the material to be processed are entrained into the degasifying apertures, or in order to increase the flow resistance encountered in the machine between the degasifying apertures, the basic idea of the present invention is applied in that the degasifying aperture is arranged adjacent the first screw shaft and the first circular ring is provided upstream of the degasifying aperture. When the circular ring is arranged directly adjacent to the degasifying aperture, the material to be processed cannot be advanced at this point along the shaft arranged adjacent to the degasifying aperture so that in the area of the degasifying aperture the material will flow along that shaft which is arranged the farthest remote from the degasifying aperture. While the gases to be evacuated from the material to be processed are still able, without any difficulties, to move past the shaft arranged adjacent to the degasifying aperture and into the degasifying aperture, the material entrained by them is caught by the shaft arranged before the degasifying aperture so that the latter is prevented from being blocked. In the case of screw machines having several degasifying apertures, the circular ring prevents the direct gas exchange between the apertures along the shaft arranged adjacent the apertures, provided the circular ring is arranged between the said apertures.

The above-described principle may be applied both to screw machines with intermeshing shafts which are driven in the same direction and to machines with shafts that do not interengage and that, as a result, may be driven either in the same or in opposite directions. And again, it goes without saying that the circular disks need not be designed as separate parts and that, on the other hand, they need not rotate with the shafts.

Instead of the circular rings seated on the shafts, there may also be provided partition walls mounted at the machine housing which exhibit essentially the shape of the circular disks and are provided with a passage opening for the associated screw shaft. The said opening could, for instance, have the shape of a U with the open end of the said U facing the other screw shaft, so that the partition walls could be mounted on the associated screw shaft from the side.

Further features, advantages and details of the invention will be apparent from the attached claims and/or the following description and the attached drawings of two embodiments of a two-shaft screw machine in accordance with the invention. In the drawings:

FIG. 1 is a plan view of the first machine, partly in cross-section;

FIGS. 2 to 10 are sectional views of the above screw machine taken along lines 2—2 to 10—10 in FIG. 1;

FIG. 11 is a plan view of the second machine, partly in cross-section along a horizontal plane.

Figure 12:
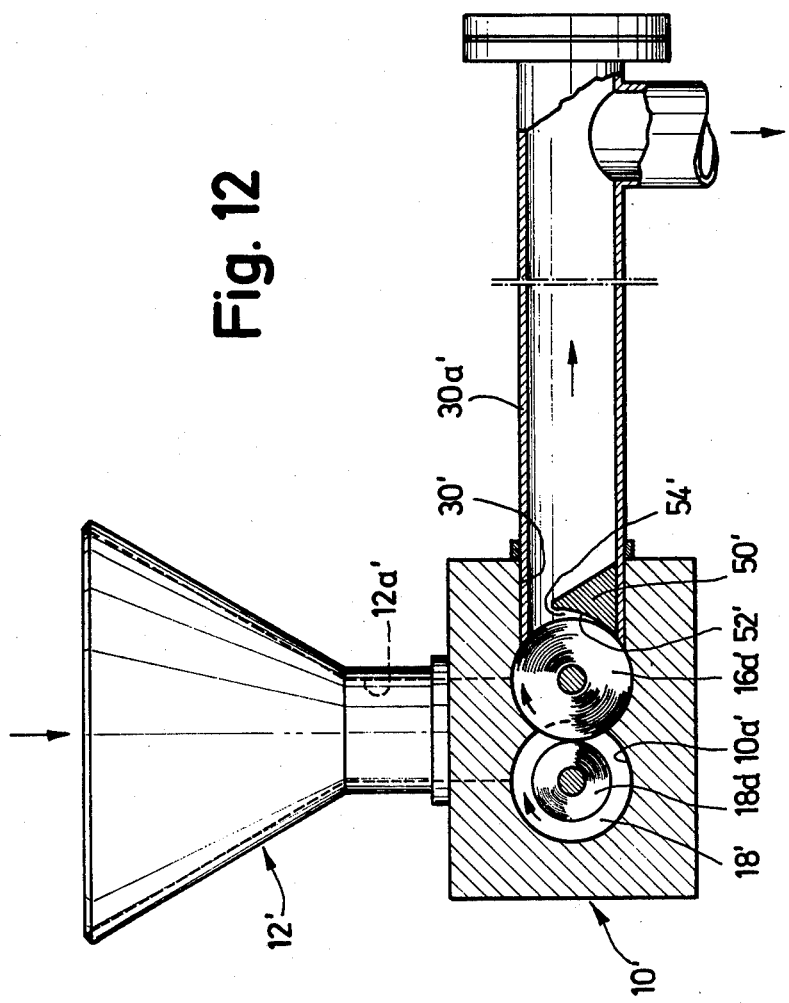
FIG. 12 is a sectional view taken along line 12—12 in FIG. 11.

In FIG. 1, a machine housing marked 10 as a whole comprises an inlet opening 12 for the material to be processed and an outlet opening 14 for the processed material. In a cavity 16 of the machine housing 10 two screw shafts 18 and 20 are provided which have their axial stubs 22 and 24 rotatably seated in a face wall 10a of the machine housing and which extend through the latter for being driven in the same direction by means of a motor 30 via a transmission 26 and a clutch 28.

According to the invention, two pairs of screw sections 18a/18c and 20a/20c, respectively, comprise between them packages 18b and 20b, respectively, of disk sections the cross-sections of which may comply only with one single requirement, namely that it must differ from a circle concentric to the associated shaft axis. In a preferred embodiment shown, the disk sections exhibit an oval, egg-shaped cross-section, and the disk sections which are arranged in series along the axis of the said screw shaft exhibit an angular displacement in relation to each other such that their conveying effect acts in the same direction as the conveying effect of the screw sections. Advantageously, the disk sections of a package and the associated core shaft section of the respective screw shaft will be designed to permit the disk sections to be rotatably displaced and fixed in relation to the said core shaft section, as described in German Patent Publication No. 25 50 969.

By a suitable choice of the angular position of the different disk sections in relation to each other and to the adjacent screw sections, the duration of the stay of the material to be processed in the homogenizing zones formed by the packages 18b and 20b and the energy which is to be introduced in the said homogenizing zone into the material to be processed may be varied and pre-determined.

According to the invention, there are also provided between the disk sections one big and one small disk-shaped circular ring 32 and 34. The arrangement is such that a large circular ring 32 on the one screw shaft is always associated with a small circular ring 34 on the other screw shaft and that each screw shaft has the large and small circular rings 32 and 34 mounted in alternate sequence. The large circular rings 32 serve to axially partition and/or seal that portion of the housing cavity 16 which encloses the screw shaft 18 or 20, respectively, so that the flow of the material to be processed along the respective screw shaft cannot be moved past such a large circular ring, but is forced to change over to the other screw shaft. To this end, the cross-section of the housing cavity 16 takes the form of two overlapping circles 16a and 16b, respectively, as shown in FIGS. 2 to 10, and the radius of the large circular ring 32 is only slightly smaller than the radius of the cross-sectional circles 16a and 16b. It was assumed here that the cross-sectional circles exhibit the same radii, which need however not necessarily be the case.

From the above explanations it results that the desired effect may be achieved also by replacing the large circular rings by partition walls mounted at the machine housing and having essentially the shape of the large circular rings and, in addition, a passage opening for the associated screw shaft. This opening could, for instance, have the shape of a U, with the open side of the U facing the other screw shaft, so that the partition walls could be positioned upon the associated screw shaft from the side.

As will be easily seen from FIG. 1, the material to be processed is initially supplied to the disk section $18^1$ of the screw shaft 18, but the large circular ring 32 arranged between the disk sections $18^1$ and $18^2$ prevent its further movement in the direction of the outlet opening 14. Accordingly, the material is caused to change over to the disk section $20^1$ of the screw shaft 20 and, as a result thereof, to pass the intermeshing zone of the two screw shafts 18 and 20. Thereafter, the material reaches the disk section $20^2$, where it is again caused by the large circular ring 32 arranged between the disk sections $20^2$ and $20^3$ to change over to the screw section $18^2$ of the screw shaft 18, so that it is again forced to pass the intermeshing zone, and so on.

From FIGS. 2 to 6 it also appears that in the preferred embodiment of the screw machine of the invention the distance A between the axes 18' and 20' of the screw shafts 18 and 20 is equal to the sum of the values R and r, in which formula R and r, respectively, define the distance between the greatest elevation 21 of the disk sections and the associated shaft axis, and the distance between the lowest elevation of the disc sections and the associated shaft axis, respectively, and the radii of the large and small circular rings 32 and 34.

Finally, it is obvious that the basic idea is not limited only to two-shaft screw machines, but may be applied also to screw machines having more than two interengaging shafts which are driven in the same direction.

The machine shown in FIGS. 11 and 12 comprises a housing 10', with a supply hopper 12' mounted thereon, and an outlet opening 14' for the processed material. In the housing, there are arranged two interengaging screw shafts 16' and 18' which are driven in the same direction, namely that indicated by the arrows, by means of a motor 20', via a clutch 22' and a transmission 24'. This arrangement conveys the material to be processed from the supply hopper 12' to the outlet opening 14'.

Adjacent to the screw shaft 16', the housing 10' is provided with two degasifying apertures 30' and 32' arranged one behind the other and formed by degasifying pipes 30a' and 32a' inserted into the housing. Directly adjacent to, and upstream of, each of the said degasifying apertures, the screw shaft 16' carries a circular ring 16a' and 16b', respectively, the diameter of which is only slightly smaller than that of the overlapping circles forming the cross-section of the housing cavity 10a' enclosing the screw shafts 16' and 18'. Opposite to the said first circular rings 16a' and 16b', the screw shaft 18' carries smaller second circular rings 18a' and 18b', the diameter of which is selected to ensure that the sum of the radii of the large and the small circular rings corresponds to the centre distance between the screw shafts 16' and 18'.

Now, the circular rings 16a' and 16b' block the material flow along the screw shaft 16' directly in front of the degasifying apertures 30' and 32', diverting it to the other screw shaft 18', so that the material to be processed does not fill the passages of the screw shaft 16' in the area of the degasifying apertures 30' and 32' and that, as a result thereof, no notable quantities of the material to be processed will be entrained by the escaping gases into the degasifying apertures or hurled into the latter by the rotating screw shaft 16'.

Moreover, the large circular ring 16b' prevents the direct gas exchange along the screw shaft 16' between the degasifying apertures 30' and 32'. Analogously, the large circular ring 16a' prevents the direct gas exchange along the screw shaft 16' between the degasifying aperture 30' and the opening 12a' of the supply hopper 12' so that a vacuum applied to any of the said openings will be by far more effective than in the known screw machines.

As will be seen from FIG. 12, there may be inserted into the degasifying apertures a guide body 50' having a guide surface 52' forming a gap 54' which tapers towards the screw shaft 16'. This guide body does, however, not fully block the degasifying aperture, but leaves a free passage. The guide surface 52' serves to return into the housing cavity any material that may have risen from the screw shaft 16' into the degasifying aperture.

What I claim is:

1. Screw machine for processing materials of solid, liquid and pasty consistency, comprising a housing and at least two screw shafts mounted for rotation in a cavity of said housing, means for rotating the screw shafts, the cross-section of said cavity having at least in a selected longitudinal area of the two screw shafts the shape of two overlapping circles concentric to the screw shaft axes, the improvement comprising at least one first circular ring mounted on a first of said screw shafts and a first circular ring mounted on the second of said screw shafts, each of said first circular rings being concentric to the axis of the screw shaft carrying the first circular ring and having a radius that is only slightly smaller than the radius of the cross-sectional circle of the housing cavity pertaining to the respective screw shaft, the first circular ring of the second screw being offset in axial direction relative to the first circular ring of the first screw shaft, at least one second circular ring mounted on the second screw shaft opposite the first circular ring of the first screw shaft, and at least one second circular ring mounted on the first screw shaft opposite the first circular ring of the second screw shaft, each of said second circular rings being concentric to the axis of the screw shaft carrying the second circular ring and having an outer diameter equal to the difference between twice the distance between the screw shaft axes and the outer diameter of the first circular ring disposed opposite to the respective second circular ring.

2. Screw machine according to claim 1, wherein several first and second circular rings are mounted on each of the two screw shafts, the first circular rings of one screw shaft being offset in axial direction relative to the first circular rings of the adjacent screw shaft by half the distance between the first circular rings of said adjacent screw shaft.

3. Screw machine according to claim 1, wherein said screw shafts comprise several disc sections, which are arranged consecutively in axial direction in said selected longitudinal area and have cross-sections differing from a circle concentric to the related screw shaft axis, the disc sections of one screw shaft being positioned substantially opposite those of the other screw shaft, each of said first and second circular rings being arranged adjacent to at least one of said disc sections.

4. Screw machine according to claim 3, wherein the outer radius of said second circular rings is smaller than the radial distance of the highest elevation of said disc sections from the pertinent screw shaft axis.

5. Screw machine according to claim 4, wherein said two cross-sectional circles of the housing cavity have identical radii and half of the outer diameter of the second circular rings equals the difference between the distance between the screw shaft axis and the radial distance of the highest elevation of the disc sections from the pertinent screw shaft axis, and wherein half of the outer diameter of the first circular rings equals the difference between the distance between the screw shaft axes and the radial distance of the lowest elevation of the disc sections from the pertinent screw shaft axis.

6. Screw machine according to claims 1, 2, 3, 4, or 5, wherein the housing cavity comprises at least one degasifying aperture which is arranged downstream of and adjacent to said first circular ring, said aperture being formed by a substantially horizontally extending channel accomodating adjacent to said first circular ring a guiding surface, which together with the adjacent screw shaft forms a gap tapering in the direction of rotation of the latter, extends upwardly from the lower channel wall and terminates at a distance from the upper channel wall, such that the gap tapers downwardly.

* * * * *

UNITED STATES PATENT AND TRADEMARK OFFICE
CERTIFICATE OF CORRECTION

PATENT NO. : 4,236,833

DATED : December 2, 1980

INVENTOR(S) : Blach

It is certified that error appears in the above—identified patent and that said Letters Patent is hereby corrected as shown below:

Column 4, line 21, "may" should read --must--.

Column 6, lines 37 and 38, "second screw being" should read --second screw shaft being--.

Signed and Sealed this

Fourteenth Day of July 1981

[SEAL]

Attest:

Attesting Officer

GERALD J. MOSSINGHOFF

Commissioner of Patents and Trademarks